July 16, 1957  S. LOBOZZO  2,799,515
ROCK DEFLECTOR FOR DUAL WHEELS
Filed Feb. 9, 1955
FIG. 1.
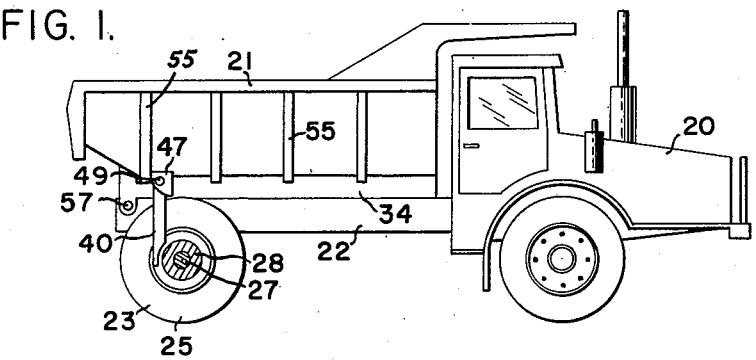
FIG. 2.
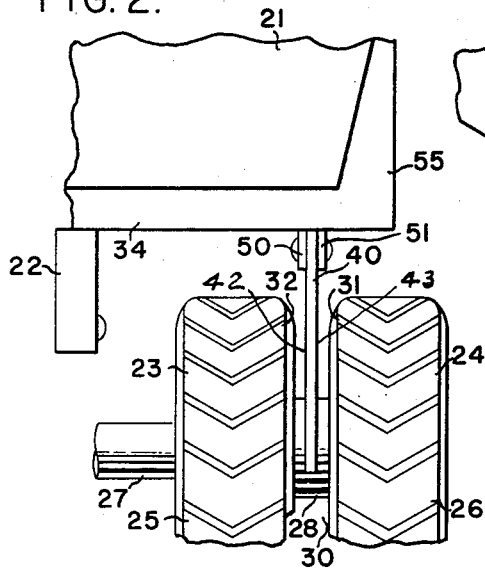
FIG. 3.
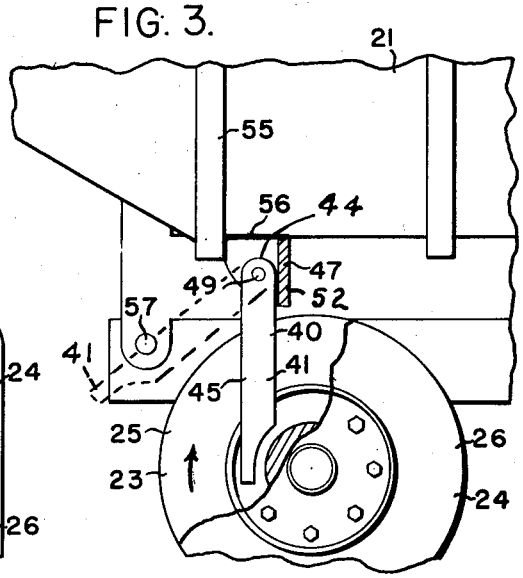
FIG. 4.
FIG. 5.
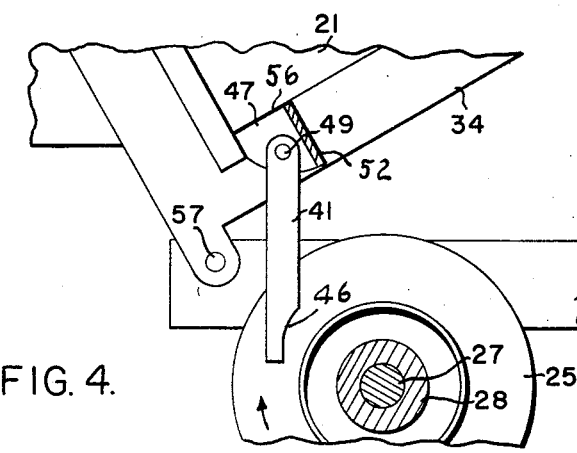
INVENTOR
SAMUEL LOBOZZO
BY
Pearson + Pearson
ATTORNEYS

United States Patent Office 2,799,515
Patented July 16, 1957

2,799,515
ROCK DEFLECTOR FOR DUAL WHEELS

Samuel Lobozzo, Gardiner, Maine

Application February 9, 1955, Serial No. 487,052

2 Claims. (Cl. 280—158)

This invention relates to an improvement in deflectors for removing mud or rocks from the space between dual tires and wheels of vehicles. It is particularly useful with heavy earth moving vehicles of the "Euclid" type in which there are no springs between the dual wheels and the truck and which normally travel off smooth surfaced highways and on rough terrain.

The principal object of the invention is the provision of a simple, rugged deflector for acting as a rigid barrier to mud or rocks picked up between dual tires and carried around the axis of revolution of the tires.

Another object of the invention is to provide a deflector of solid bar metal weighing sixty or seventy pounds and normaly hanging plumb and vertically pendant from a horizontal pivot whereby the vertical position of the deflector is retained, solely by the force of gravity, when a truck body is lifted for dumping purposes.

A further object of the invention is the provision of a pivoted heavy deflector bar which normally presents a rigid barrier to rocks caught between the dual tires of forward moving vehicles and presents a heavy but yieldable barrier to the same when the vehicle is moving rearwardly.

Still another object of the invention is to provide a bar deflector which extends down into the space between dual tires to the level of the spacer discs therebetween but which does not bear upon the tires at any time.

A still further object of the invention is to provide a low cost, sturdy deflector and bracket which can be fixed to the under surface of a truck body with the deflector in pendant plumb position in the space between the dual tires for ejecting rocks and mud but with the bracket pivotable in the plumb deflector during dumping and the deflector pivotable on the bracket to permit the removal of the inside wheel or tire.

It has heretofore been proposed to mount a deflector element between the tires of dual wheels but such elements have usually been spring pressed to yield upwardly as in U. S. Patent No. 2,356,292 to Wildman of August 22, 1944, or to yield forwardly as in Great Britain Patent No. 156,072 to Rispaud of July 7, 1921. In this invention the deflector bar is pivoted below the truck body preferably in rear of the dual wheel axle. The deflector bar cannot yield forwardly. The deflector bar can be pivoted rearwardly only against the opposition of its own substantial weight and springs are completely eliminated from the assembly.

In the drawing:

Fig. 1 is a side elevation of a typical heavy earth moving truck with one dual wheel broken away to show the device of this invention.

Fig. 2 is an enlarged, fragmentary rear elevation showing the deflector and bracket of this invention fixed to such a truck.

Fig. 3 is a side elevation of the device shown in Figs. 1 and 2 with a portion of an outside tire broken away.

Fig. 4 is a view similar to Fig. 3 showing the position assumed by the deflector member when the truck body is raised.

Fig. 5 is a perspective view with the bracket broken away of the preferred form of the deflector disassociated from a vehicle.

As shown in the drawing 20 is a heavy, earth moving truck of the "Euclid" type made by General Motors Corporation and typical of dump trucks made by other manufacturers for use in large scale construction projects such as the building of highways, dams and the like. Such trucks include a dump body 21, a chassis 22 and laterally spaced dual rear drive wheels such as 23 and 24 having pneumatic tires 25 and 26. A rear axle 27 forms the axis of rotation for the dual wheels 23 and 24 and spacers 28 are provided between the wheels to permit the tires to expand without contacting each other.

In trucks having springs between the wheels and chassis or body, it should be noted that the space 30 between the inside faces 31 and 32 of a pair of dual tires such as 25 and 26 does not remain in fixed relationship to the body of the vehicle and instead changes its angular relationship therewith as the vehicle moves over mounds or depressions on one side or the other. In the non spring mounted vehicle, however, the space 30 and tires 25 and 26 remain always in planes perpendicular to the horizontal portion 33 of the undersurface 34 of the truck body 21.

The deflector 40 of this invention includes an elongated member 41 of heavy material such as solid bar metal preferably of greater length than the length of the radius of a wheel 24 including its tire 26. Member 41 has parallel opposite side faces 42 and 43 spaced apart a distance nearly equal to the distance between inside faces 31 and 32 of tires 25 and 26 whereby it extends substantially entirely across the space 30. The length of the member 41 permits it to extend from a point above and beyond the periphery of the tires 25 and 26 down into space 30 to a point on level with the spacer 28. Preferably member 40 is about one and one half inches in width, several inches in depth intermediate thereof and weighs in the vicinity of seventy pounds. Such a weight has little effect on the overall weight of a heavy earth moving truck. One end 44 of member 41 is particircular in outline and includes a concentric bore 45 forming a pivot pin hole. The opposite end 53, of member 41, preferably includes a parti-circular cutout or recess 46 arranged to conform to the circumference of a spacer 28.

Deflector 40 also includes a bracket 47 of rigid metal and sturdy construction, adapted to be welded or otherwise fixed to the undersurface 34 of a truck body 21 as at 56. As shown in Fig. 5, bracket 47 includes a pivot pin or spindle 49 for the bore 45 of member 41 whereby the member 41 is pivotably mounted thereon. Preferably bracket 47 is of U shape with the pin 49 extending between the legs 50 and 51 of the U, the rounded end 44 of member 41 embraced by the legs and the loop, or bight, 52 of the U forming a rigid integral abutment in the path of pivoting of member 41. Thus, when member 41 is in plumb pendant position below bracket 47 it may pivot freely by manual oscillation, or be rearwardly displaced while plumb, in a direction away from the abutment at 52 but will be stopped from pivoting in the opposite direction by the abutment and/or spacer 28.

It will be obvious that bolt holes may be provided in bracket 47 for affixation by bolts to a truck body or that suitable flanges having such bolt holes may be incorporated into the bracket for the same purpose. However, it has been found more desirable to permanently weld the bracket to a transverse rib such as 55 of the truck body as indicated at 56 in Fig. 3. Preferably also the bracket 47 is positioned on the body 21 above the level of the tires 25 and 26, above the space 30 and in rear of the axis of rotation of the tires rather than forward of the axis. The bracket 47 may be fixed to the truck body in rear of the axis of rotation of the tires but spaced forwardly from rib 55 in order to cause the spacer 28 to form the unyielding abutment rather than the bracket portion 52, if desired.

When member 41 is in depending position hanging plumb from bracket 47, the cutout 46 is proximate spacer 28 and in the installation illustrated, at no time touches the spacer because of the abutment 52. During forward movement of the vehicle any rocks or mud picked up between the tires are carried around in the direction of the arrows to strike the rigid unyieldable barrier formed by member 41. They are then deflected upwardly and outwardly until beyond the periphery of the tires to fall back onto the ground. During rearward movement of the truck, it is less likely that foreign matter will be picked up between the tires but, in any case, the member 41 forms a barrier for ejecting the same and is yieldable rearwardly only by overcoming its great weight and inertia.

As indicated in Fig. 3 in dotted lines the member 41 can be pivoted rearwardly to enable an inside wheel or tire to be removed. As shown in Fig. 4, the inclining of the body 21 on its pivot connection 57 to chassis 22, for dumping a load merely raises the deflector 40 without changing the plumb vertical pendant position of member 41.

I claim:

1. In combination with a dual wheel vehicle having a dump body non resiliently mounted on a chassis for carrying heavy loads, a U-shaped bracket affixed to the under portion of said dump body, above the level of a pair of dual wheels, the legs of said bracket extending longitudinally of said vehicle, a single pivot pin extending laterally between the legs of said bracket and a heavy, elongated, bar having its upper end pivotally supported on said pivot pin, between said legs, for swinging only longitudinally of said vehicle and having its lower end in rear of, and at the level of the axis of rotation of said dual wheels, said bar hanging plumb below said bracket when said dump body is lifted and being swingable rearwardly for the removal of a tire.

2. A combination as specified in claim 1 wherein the lower end of said bar includes a recess in the forward face thereof, proximate the axis of rotation of said dual wheels, said recess conforming to the shape of the spacer of said dual wheels.

References Cited in the file of this patent
UNITED STATES PATENTS

| | | |
|---|---|---|
| 2,356,292 | Wildman | Aug. 22, 1944 |
| 2,738,986 | Pelton | Mar. 20, 1956 |

FOREIGN PATENTS

| | | |
|---|---|---|
| 572,893 | France | Feb. 29, 1924 |
| 156,072 | Great Britain | July 7, 1921 |